(12) United States Patent
Paulo

(10) Patent No.: US 11,672,371 B1
(45) Date of Patent: Jun. 13, 2023

(54) SECURE PACKAGE DELIVERY RECEPTACLE WITH BAR CODE

(71) Applicant: Fernando Paulo, Elizabeth, NJ (US)

(72) Inventor: Fernando Paulo, Elizabeth, NJ (US)

(*) Notice: Subject to any disclaimer, the term of this patent is extended or adjusted under 35 U.S.C. 154(b) by 301 days.

(21) Appl. No.: 17/196,080

(22) Filed: Mar. 9, 2021

(51) Int. Cl.
| G08B 21/00 | (2006.01) |
| A47G 29/14 | (2006.01) |
| G06Q 10/0833 | (2023.01) |
| G06K 19/06 | (2006.01) |

(52) U.S. Cl.
CPC ......... *A47G 29/14* (2013.01); *G06K 19/0614* (2013.01); *G06K 19/06028* (2013.01); *G06Q 10/0833* (2013.01)

(58) Field of Classification Search
CPC ............. A47G 29/14; G06K 19/06028; G06K 19/0614; G06Q 10/0833
USPC ...................................................... 340/568.1
See application file for complete search history.

(56) References Cited

U.S. PATENT DOCUMENTS

| 5,774,053 A | 6/1998 | Porter |
| D482,510 S | 11/2003 | Stout |
| 6,967,575 B1 | 11/2005 | Dohrmann |
| 10,413,106 B1 | 9/2019 | Valeriano |
| 2007/0118488 A1 | 5/2007 | Bozzomo |
| 2016/0066733 A1* | 3/2016 | Gozar ................... A47G 29/141 232/18 |
| 2017/0091710 A1* | 3/2017 | Van Dyke ............ G08G 5/0043 |
| 2017/0091711 A1* | 3/2017 | Akselrod ........... G06Q 10/0836 |
| 2017/0147975 A1* | 5/2017 | Natarajan ............ A47G 29/141 |
| 2019/0159620 A1 | 5/2019 | Veon |
| 2020/0005238 A1* | 1/2020 | Richardson ........ G06Q 10/0836 |
| 2020/0035050 A1* | 1/2020 | Carter ................... H04W 4/023 |

FOREIGN PATENT DOCUMENTS

WO 2019108643 6/2019

* cited by examiner

*Primary Examiner* — Mark S Rushing
(74) *Attorney, Agent, or Firm* — Kyle A. Fletcher, Esq.

(57) ABSTRACT

The secure package delivery receptacle with bar code is a container. The secure package delivery receptacle with bar code comprises a receiving box and a control circuit. The control circuit is contained in the receiving box. The receiving box is a hollow structure. The receiving box is configured for use with one or more packages. The receiving box securely receives and stores the one or more packages. The control circuit controls access into the hollow interior of the receiving box. The control circuit scans a bar code found on the one or more packages. The control circuit confirms that the scanned bar code is expected with an appropriate authority. Once the expected receipt is confirmed, the control circuit allows access into the receiving box for the delivery of one or more packages.

17 Claims, 6 Drawing Sheets

SECURE PACKAGE DELIVERY RECEPTACLE WITH BAR CODE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of domestic articles including receiving containers, more specifically, a receptacle for parcels with appliances for preventing unauthorized removal of the deposited articles. (A47G29/141)

Summary of Invention

The secure package delivery receptacle with bar code is a container. The secure package delivery receptacle with bar code comprises a receiving box and a control circuit. The control circuit is contained in the receiving box. The receiving box is a hollow structure. The receiving box is configured for use with one or more packages. The receiving box securely receives and stores the one or more packages. The control circuit controls access into the hollow interior of the receiving box. The control circuit scans a bar code found on the one or more packages. The control circuit confirms that the scanned bar code is expected with an appropriate authority. Once the expected receipt is confirmed, the control circuit allows access into the receiving box for the delivery of one or more packages.

These together with additional objects, features and advantages of the secure package delivery receptacle with bar code will be readily apparent to those of ordinary skill in the art upon reading the following detailed description of the presently preferred, but nonetheless illustrative, embodiments when taken in conjunction with the accompanying drawings.

In this respect, before explaining the current embodiments of the secure package delivery receptacle with bar code in detail, it is to be understood that the secure package delivery receptacle with bar code is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the secure package delivery receptacle with bar code.

It is therefore important that the claims be regarded as including such equivalent construction insofar as they do not depart from the spirit and scope of the secure package delivery receptacle with bar code. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
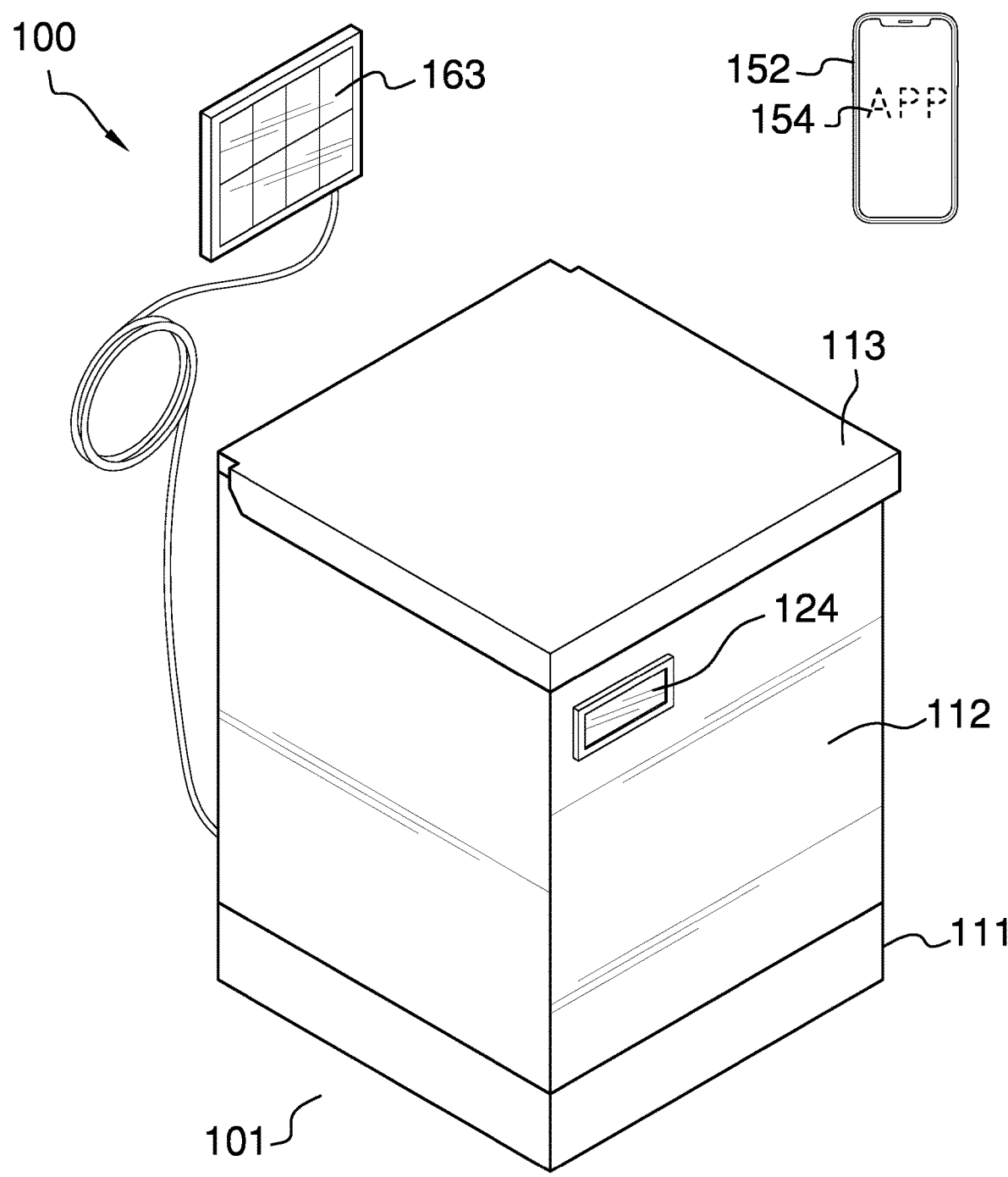
FIG. 1 is a perspective view of an embodiment of the disclosure.
Figure 2:
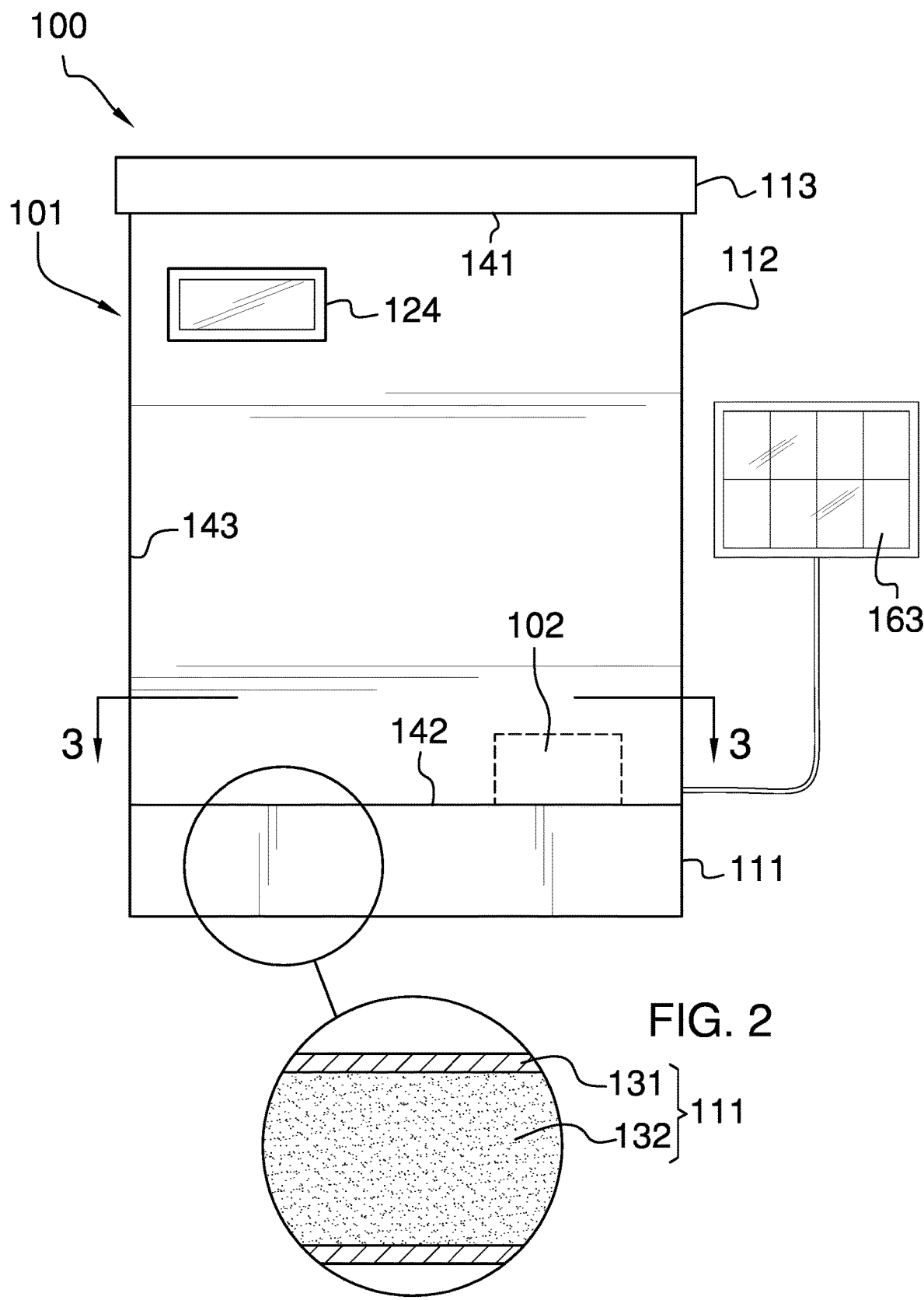
FIG. 2 is a front view of an embodiment of the disclosure.
Figure 3:
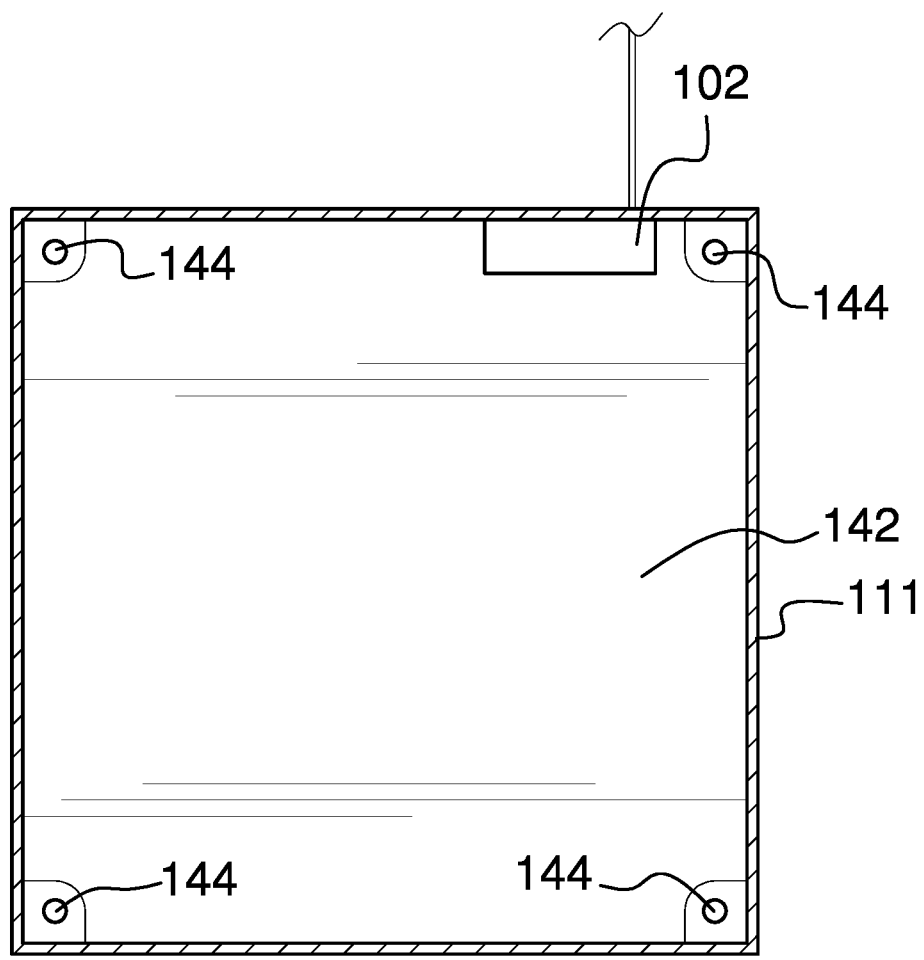
FIG. 3 is a detail view of an embodiment of the disclosure.
Figure 4:
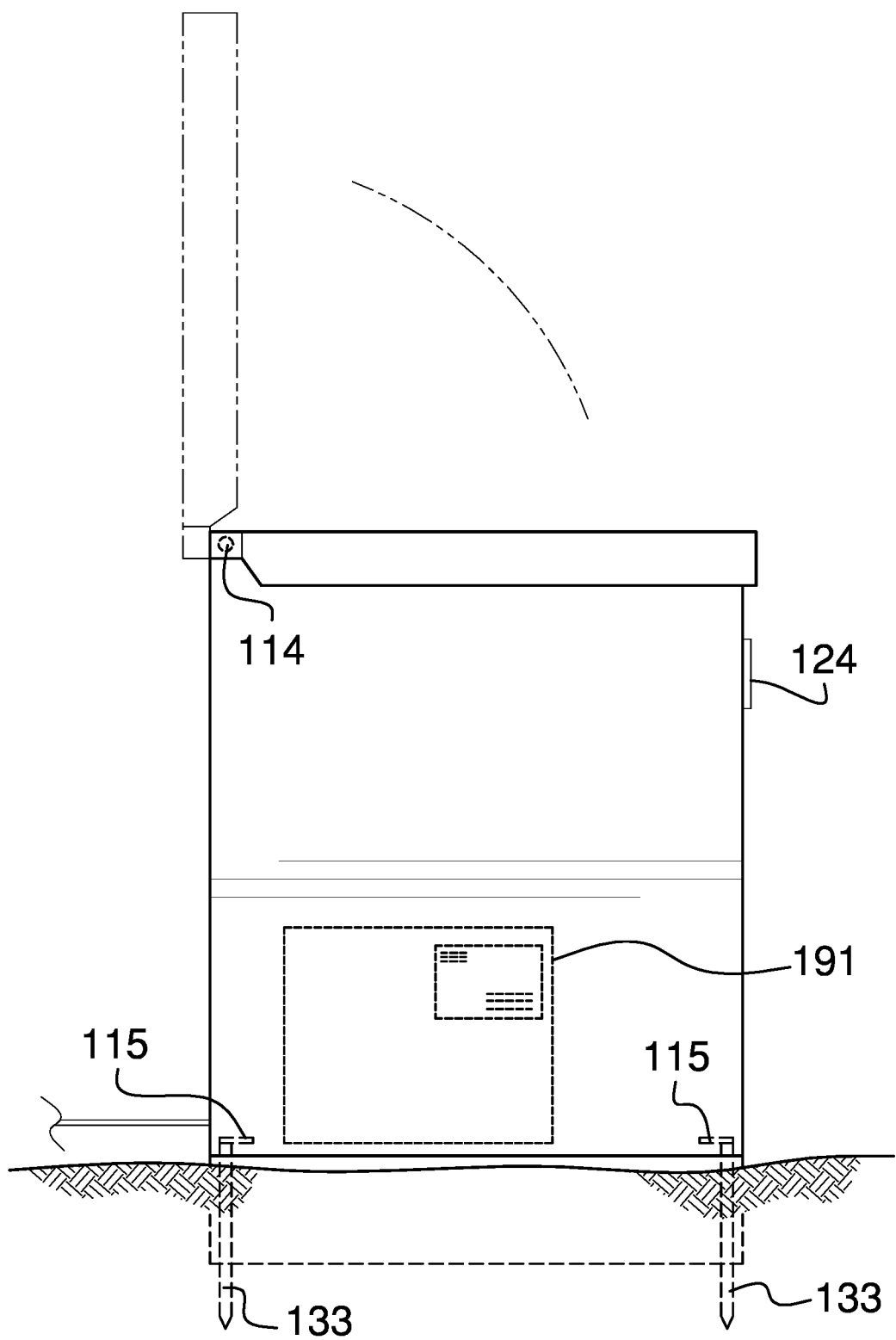
FIG. 4 is a side detail view of an embodiment of the disclosure.
Figure 5:
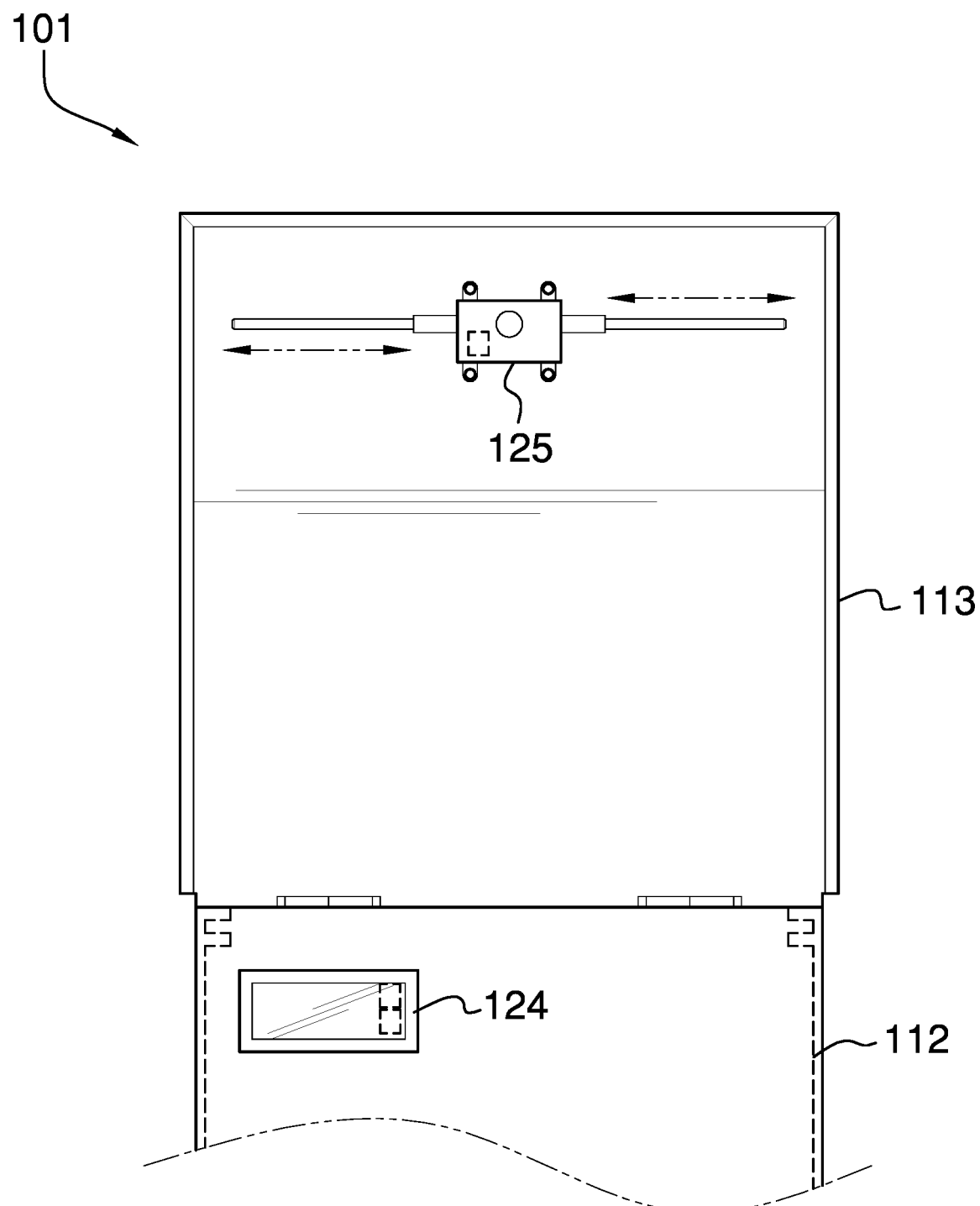
FIG. 5 is a front detail view of an embodiment of the disclosure.
Figure 6:
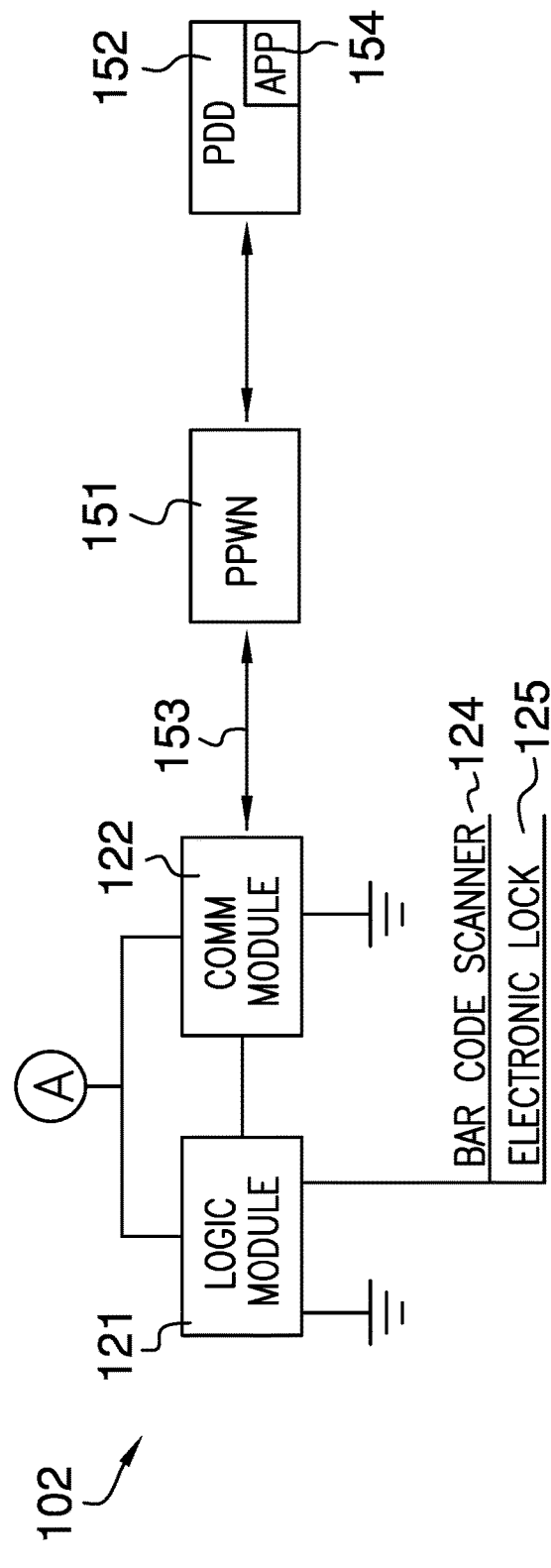
FIG. 6 is a schematic view of an embodiment of the disclosure.
Figure 6:
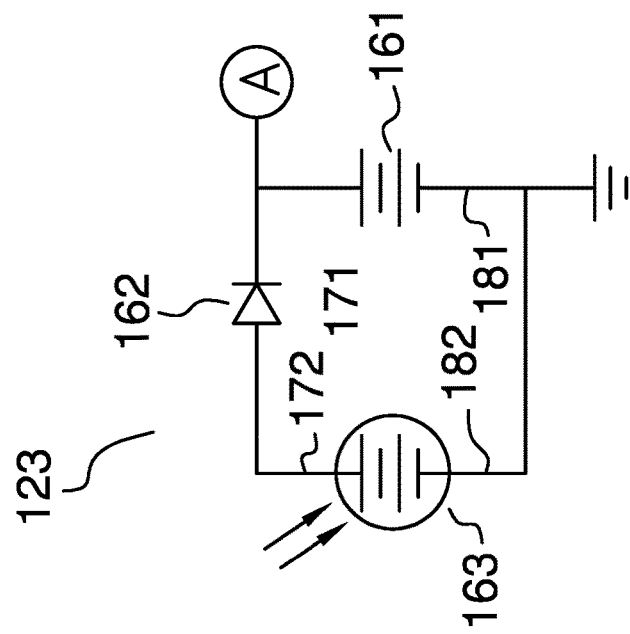

Detailed reference will now be made to one or more potential embodiments of the disclosure, which are illustrated in FIGS. 1 through 6.

The secure package delivery receptacle with bar code 100 (hereinafter invention) is a container. The invention 100 comprises a receiving box 101 and a control circuit 102. The control circuit 102 is contained in the receiving box 101. The receiving box 101 is a hollow structure. The receiving box 101 is configured for use with one or more packages 191. The receiving box 101 securely receives and stores the one or more packages 191. The control circuit 102 controls access into the hollow interior of the receiving box 101. The control circuit scans a bar code found on the one or more packages 191. The control circuit 102 confirms that the scanned bar code is expected with an appropriate authority. Once the expected receipt is confirmed, the control circuit 102 allows access into the receiving box 101 for the delivery of one or more packages 191.

The receiving box 101 is a prism-shaped structure. The receiving box 101 forms a composite prism structure. The receiving box 101 is a hollow structure. The receiving box 101 is a container. The receiving box 101 forms a protected space used to receive and store the one or more packages 191. The receiving box 101 anchors to the ground. The receiving box 101 comprises an anchor pedestal 111, a containment pan 112, a lid structure 113, a hinge 114, and a plurality of locking nuts 115.

The anchor pedestal 111 forms a pedestal that transfers the loads of the receiving box 101, the control circuit 102, and the one or more packages 191 to a supporting surface. The supporting surface is assumed to be the ground. The anchor pedestal 111 anchors to the ground. The anchor pedestal 111 forms an anchor point to which the balance of the receiving box attaches such that the receiving box 101 remains in a fixed position. The anchor pedestal 111 comprises an anchor structure 131, a ballast 132, and a plurality of anchor bolts 133.

The anchor structure 131 is a prism-shaped structure. The anchor structure 131 is a hollow structure. The anchor structure 131 has a disk shape. The anchor structure 131 forms the final link of the load path that transfers the load of the invention 100 and the one or more packages 191 to the ground. The anchor structure 131 forms a pedestal that elevates the containment pan 112 above the ground. The face of the disk structure of the anchor structure 131 is geometrically similar to the closed face 142 of the containment pan 112. The closed face 142 of the containment pan 112 rests on the face of the disk structure of the anchor structure 131. The containment pan 112 attaches to the anchor structure 131 to form a composite prism structure.

The ballast 132 is a bulk solid material, such as sand, that fills the hollow interior of the anchor structure 131. The ballast 132 provides mass to the anchor pedestal 111 that makes the invention 100 difficult to move.

Each of the plurality of anchor bolts 133 is a bolt. Each of the plurality of anchor bolts 133 inserts through both faces of the disk structure of the anchor structure 131 such that the ends of each of the plurality of anchor bolts 133 extends beyond the faces of the disk structure of the anchor structure 131. Each of the plurality of anchor bolts 133 anchors the anchor structure 131 into the ground. Each of the plurality of anchor bolts 133 inserts into the containment pan 112 of the receiving box 101 such that the containment pan 112 can be anchored to the anchor pedestal 111.

The containment pan 112 is a prism-shaped structure. The containment pan 112 has a pan shape. The containment pan 112 forms the inferior and vertical boundaries of the protected space formed by the receiving box 101. The containment pan 112 is a rigid structure. The containment pan 112 contains control circuit 102. The containment pan 112 is formed with all apertures and form factors necessary to allow the containment pan 112 to accommodate the use and operation of the control circuit 102. Methods to form a containment pan 112 suitable for the purposes described in this disclosure are well-known and documented in the mechanical arts. The applicant prefers that the containment pan 112 be formed from steel. The containment pan 112 comprises an open face 141, a closed face 142, and a plurality of lateral faces 143. The closed face 142 further comprises a plurality of anchor bolt 133 nuts 144.

Each of the plurality of lateral faces 143 is a vertically oriented surface. Each of the plurality of lateral faces 143 forms a portion of the vertical boundary of the protected space formed by the receiving box 101. The plurality of lateral faces forms the perimeter of the open face 141 of the containment pan 112.

The open face 141 is the open face 141 of the pan structure of the containment pan 112. The open face 141 forms the superior boundary of the containment pan 112 when the invention 100 is properly anchored to the ground.

The closed face 142 is the closed face 142 of the pan structure of the containment pan 112. The closed face 142 is the face of the pan structure of the containment pan 112 that is distal from the open face 141. The closed face 142 forms the inferior boundary surface of the protected space formed by the receiving box 101.

Each of the plurality of anchor bolt 133 nuts 144 is a clean nut. The clean nut is defined elsewhere in this disclosure. Each of the plurality of anchor bolt 133 nuts 144 forms an aperture through the closed face 142 of the containment pan 112. Each of the plurality of anchor bolt 133 nuts 144 is positioned such that an anchor bolt selected from the plurality of anchor bolts 133 inserts into the protected space formed by the receiving box 101 through an anchor bolt nut selected from the plurality of anchor bolt 133 nuts 144.

The containment pan 112 is anchored to the anchor pedestal by screwing a locking nut selected from the plurality of locking nuts 115 onto an anchor bolt selected from the plurality of anchor bolts 133 after the selected anchor bolt has been inserted through an anchor bolt nut selected from the plurality of anchor bolt 133 nuts 144.

The hinge 114 is a fastening structure that attaches the lid structure 113 to the containment pan 112. The hinge 114 is a rotating structure. The hinge 114 attaches the lid structure 113 to the containment pan 112 such that the lid structure 113 rotates relative to the containment pan 112. The hinge 114 attaches the lid structure 113 to the containment pan 112 such that the hinge 114 is not accessible from the exterior of the receiving box 101. The lid structure 113 is a prism-shaped structure. The lid structure 113 is a disk-shaped structure. The faces of the disk structure of the lid structure 113 are geometrically similar to the open face 141 of the containment pan 112. The applicant prefers that the lid structure 113 be formed from steel.

The lid structure 113 forms a rotating barrier that controls access to the protected space formed by the receiving box 101 through the open face 141 of the anchor pedestal 111. The lid structure 113 rotates between an open position and a closed position. The lid structure 113 encloses the open face of the containment pan 112 when the lid structure 113 is in the closed position. The lid structure 113 provides access into the protected space formed by the receiving box 101 when the lid structure 113 is in the open position.

Each of the plurality of locking nuts 115 is a threaded nut. Each locking nut selected from the plurality of locking nuts 115 screws onto an anchor bolt selected from the plurality of anchor bolts 133. Each locking nut selected from the plurality of locking nuts 115 attaches to the selected anchor bolt such that the selected nut is fully contained in the protected space formed by the receiving box 101.

The control circuit 102 is an electrically powered device. The control circuit 102 is an electromechanical device. The control circuit 102 is an electric circuit. The control circuit 102 controls access into the protected space formed by the receiving box 101. The control circuit 102 forms a wireless communication link 153 with the personal data device 152 of an appropriate authority.

The control circuit 102 scans a bar code that is applied to a package selected from the one or more packages 191. The control circuit 102 transmits the scanned bar code information to the personal data device 152. The control circuit 102 receives confirmation that the package displaying the scanned bar code is expected for delivery. After receiving confirmation that the selected package is expected, the control circuit 102 allows access into the protected space formed by the receiving box 101.

The control circuit 102 is an independently powered electric circuit. By independently powered is meant that the control circuit 102 can operate without an electrical connection to an external power source.

The control circuit 102 comprises a logic module 121, a communication module 122, and a power circuit 123. The logic module 121 further comprises a bar code scanner 124 and an electronic lock 125. The logic module 121, the communication module 122, the power circuit 123, the bar code scanner 124, and the electronic lock 125 are electrically interconnected.

The logic module 121 is a readily and commercially available programmable electronic device that is used to manage, regulate, and operate the control circuit 102. The communication module 122 is a wireless electronic communication device that allows the logic module 121 to wirelessly communicate with a personal data device 152. Specifically, the communication module 122 establishes a wireless communication link 153 between the control circuit 102 and the personal data device 152 of an appropriate authority. The appropriate authority is responsible for confirming that the bar code scanned by the bar code scanner 124 is associated with a package selected from the one or more packages 191 that the appropriate authority is expecting to receive.

The bar code scanner 124 is an electrical device. The bar code scanner 124 captures an image of the bar code that is applied to a package selected from the one or more packages 191. The bar code scanner 124 transmits the captured image to the logic module 121 such that the logic module 121 can decode the identifying information contained within the scanned bar code. The bar code scanner 124 transmits the decoded information to the personal data device 152 to confirm that the package identified by the bar code is expected by the personal data device 152 for delivery.

The electronic lock 125 is an electrically operated lock. The electronic lock 125 locks the lid structure 113 to the containment pan 112 when the lid structure 113 is in the closed position. The logic module 121 controls the operation of the electronic lock 125. The logic module 121 releases the electronic lock 125 once the personal data device 152 confirms the expected delivery of the selected package.

The communication module 122 communicates SMS and MMS messages between the logic module 121 and the appropriate authority through a commercially provided and publicly available cellular wireless network 151. The use of a commercially provided and publicly available cellular wireless network 151 is preferred because: a) of its low cost; b) of the widespread availability and the broad interoperability between competing commercially provided and publicly available cellular wireless networks 151; and, c) methods and techniques to send SMS and MMS messages over a commercially provided and publicly available cellular wireless network 151 are well known and documented by those skilled in the electrical arts.

The communication module 122 further comprises a commercially provided and publicly available cellular wireless network 151, a personal data device 152, and a wireless communication link 153. The personal data device 152 further comprises an application 154. The wireless communication link 153 forms a communication link between the control circuit 102 and the commercially provided and publicly available cellular wireless network 151. The commercially provided and publicly available cellular wireless network 151 forms a communication link between the control circuit 102 and the personal data device 152.

The personal data device 152 is a programmable electrical device that provides data management and communication services through one or more functions referred to as an application 154. The application 154 is a set of logical operating instructions that are performed by the personal data device 152. The addition of an application 154 will provide increased functionality for the personal data device 152. This disclosure assumes that an application 154 exists for the purpose of interacting with the invention 100. Methods to design and implement an application 154 on a personal data device 152 are well known and documented in the electrical arts.

The power circuit 123 is an electrical circuit. The power circuit 123 powers the operation of the control circuit 102. The power circuit 123 is an electrochemical device. The power circuit 123 converts chemical potential energy into the electrical energy required to power the control circuit 102. The power circuit 123 comprises a battery 161, a diode 162, and a photovoltaic cell 163.

The battery 161 is an electrochemical device. The battery 161 converts chemical potential energy into the electrical energy used to power the control circuit 102. The battery 161 is a commercially available rechargeable battery 161. The photovoltaic cell 163 is an electrical device that converts light into electrical energy. The chemical energy stored within the rechargeable battery 161 is further renewed and restored through the use of the photovoltaic cell 163. The photovoltaic cell 163 is directly wired to the battery 161. The photovoltaic cell 163 is an electrical circuit that reverses the polarity of the rechargeable battery 161 and provides the energy necessary to reverse the chemical processes that the rechargeable battery initially used to generate the electrical energy. This reversal of the chemical process creates a chemical potential energy that will later be used by the rechargeable battery 161 to generate electricity.

The diode 162 is an electrical device that allows current to flow in only one direction. The diode 162 installs between the rechargeable battery 161 and the photovoltaic cell 163 such that electricity will not flow from the first positive terminal 171 of the rechargeable battery 161 into the second positive terminal 172 of the photovoltaic cell 163. The photovoltaic cell 163 is defined elsewhere in this disclosure.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Anchor: As used in this disclosure, anchor means to hold an object firmly or securely.

Anchor Point: As used in this disclosure, an anchor point is a location to which a first object can be securely attached to a second object.

Application or App: As used in this disclosure, an application or app is a self-contained piece of software that is especially designed or downloaded for use with a personal data device.

Appropriate Authority: As used in this disclosure, an appropriate authority is a previously determined person or organization that is designated to send and receive alarm or other notification messages regarding a monitored system or activity.

Ballast: As used in this disclosure, ballast refers to an inert and heavy subcomponent of a structure that: a) lowers the center of mass of the structure; and, b) stabilizes the structure so that the structure is difficult to move or rotate. The weight of the ballast is often formed from a bulk solid material.

Bar Code: As used in this disclosure, a bar code is a machine readable coding scheme that converts text based information presented on an object into a machine readable format.

Barrier: As used in this disclosure, a barrier is a physical obstacle that forms a boundary between a first space and a second space. The barrier prevents the passage of an object between the first space and the second space.

Battery: As used in this disclosure, a battery is a chemical device consisting of one or more cells, in which chemical energy is converted into electricity and used as a source of power. Batteries are commonly defined with a positive terminal and a negative terminal.

Bolt: As used in this disclosure, a bolt is a cylindrical shaft that is formed with an exterior screw thread. A bolt is defined with an outer diameter.

Bulk Solid: As used in this disclosure, a bulk solid is a material that is formed from an accumulation of discrete particles. While the discrete particles of the bulk solid are solid materials, in aggregate the physical performance of bulk solid will exhibit fluid characteristics such as flow or taking the shape of a container.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Clean Nut: As used in this disclosure, a clean nut is a prism-shaped disk that is formed with a cylindrical negative space that allows a shaft to be inserted through the faces of the disk. A clean nut is further defined with an inner diameter.

Closed Position: As used in this disclosure, a closed position refers to a movable barrier structure that is in an orientation that prevents passage through a port or an aperture. The closed position is often referred to as an object being "closed." Always use orientation.

Commercially Provided And Publicly Available Cellular Wireless Network: As used in this disclosure, a commercially provided and publicly available cellular wireless network refers to subscription based publically available wireless network commonly used to provide wireless communication access for personal data devices. The commercially provided and publicly available cellular wireless network will typically provide voice communication, data communication services, and SMS and MMS messaging services. The commercially provided and publicly available cellular wireless network is commonly referred to as the cellular network. The commercially provided and publicly available cellular wireless network is abbreviated as the PPWN. See subscription.

Communication Link: As used in this disclosure, a communication link refers to the structured exchange of data between two objects.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Container: As used in this disclosure, a container is a structure that forms a protected space used to store and transport an object.

Control Circuit: As used in this disclosure, a control circuit is an electrical circuit that manages and regulates the behavior or operation of a device.

Correspond: As used in this disclosure, the term correspond is used as a comparison between two or more objects wherein one or more properties shared by the two or more objects match, agree, or align within acceptable manufacturing tolerances.

Diode: As used in this disclosure, a diode is a two terminal semiconductor device that allows current flow in only one direction. The two terminals are called the anode and the cathode. Electric current is allowed to pass from the anode to the cathode.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Electronic Lock: As used in this disclosure, an electronic lock is an electromechanically operated lock that: 1) mechanically locks an object; and, 2) is secured and released using an electrical or electronically driven mechanism.

External Power Source: As used in this disclosure, an external power source is a source of the energy that is externally provided to enable the operation of the present disclosure. Examples of external power sources include, but are not limited to, electrical power sources and compressed air sources.

Exterior: As used in this disclosure, the exterior is used as a relational term that implies that an object is not contained within the boundary of a structure or a space.

Exterior Screw Thread: An exterior screw thread is a ridge wrapped around the outer surface of a tube in the form of a helical structure that is used to convert rotational movement into linear movement.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Ground: As used in this disclosure, the ground is a solid supporting surface formed by the Earth. The term level ground means that the supporting surface formed by the ground is roughly perpendicular to the force of gravity.

Helix: As used in this disclosure, a helix is the three-dimensional structure that would be formed by a wire that is wound uniformly around the surface of a cylinder or a cone. If the wire is wrapped around a cylinder the helix is called a cylindrical helix. If the wire is wrapped around a cone, the helix is called a conical helix. A synonym for conical helix would be a volute.

Hinge: As used in this disclosure, a hinge is a device that permits the turning, rotating, or pivoting of a first object relative to a second object. A hinge designed to be fixed into a set position after rotation is called a locking hinge. A spring loaded hinge is a hinge formed as an elastic structure. The elastic structure of the spring loaded hinge is deformed under a rotating force such that the elastic structure returns the spring loaded hinge back to its relaxed shape after the rotating force is removed from the spring loaded hinge.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Housing: As used in this disclosure, a housing is a rigid structure that encloses and protects one or more devices.

Inert: As used in this disclosure, inert is an adjective that is applied to an object, system, or chemical reaction. Inert means that the object, system, or chemical reaction is incapable of internal motion, internal activity or is otherwise unreactive.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Interior Screw Thread: An interior screw thread is a groove that is formed around the inner surface of a tube in the form of a helical structure that is used to convert rotational movement into linear movement.

Lid: As used in this disclosure, a lid is a removable cover that is placed over an opening of a hollow structure to enclose the hollow structure.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Lock: As used in this disclosure, a lock is a fastening device that secures a rotating mechanical device into a fixed position.

Lock: As used in this disclosure, a lock is a fastening device that fixes the position of a first object relative to a second object such that the first object and the second object are subsequently releasable.

Logic Module: As used in this disclosure, a logic module is a readily and commercially available electrical device that accepts digital and analog inputs, processes the digital and analog inputs according to previously specified logical processes and provides the results of these previously specified logical processes as digital or analog outputs. The disclosure allows, but does not assume, that the logic module is programmable.

Negative Space: As used in this disclosure, negative space is a method of defining an object through the use of open or empty space as the definition of the object itself, or, through the use of open or empty space to describe the boundaries of an object.

Nut: As used in this disclosure, a nut is a prism-shaped disk that is formed with a cylindrical negative space that allows a shaft to be inserted through the faces of the disk. A nut is further defined with an inner diameter. The nut may or may not be formed with an interior screw thread. See spacer One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Open Position: As used in this disclosure, an open position refers to a movable barrier structure that is in an orientation that allows passage through a port or an aperture. The open position is often referred to as an object being "open."

Orientation: As used in this disclosure, orientation refers to the positioning of a first object relative to: 1) a second object; or, 2) a fixed position, location, or direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan is are open.

PDD: As used in this disclosure, PDD is an acronym for personal data device.

Pedestal: As used in this disclosure, a pedestal is an intermediary load bearing structure that forms a load path between a supporting surface and an object, structure, or load.

Perimeter: As used in this disclosure, a perimeter is one or more curved or straight lines that bounds an enclosed area on a plane or surface. The perimeter of a circle is commonly referred to as a circumference.

Personal Data Device: As used in this disclosure, a personal data device is a handheld logical device that is used for managing personal information and communication. Examples of personal data device include, but are not limited to, cellular phones, tablets, and smartphones.

Photoelectric: As used in this disclosure, photoelectric is an adjective used to describe an electronic component in which the performance of the electronic component is modified by light. Typical photoelectric devices include, but are not limited to, photoelectric transistors, photoelectric diodes, and photoelectric resistors.

Photovoltaic Cell: As used in this disclosure, a photovoltaic cell is a photoelectric device that directly converts light energy into electrical energy.

Pivot: As used in this disclosure, a pivot is a rod or shaft around which an object rotates or swings.

Plug: As used in this disclosure, a plug is an electrical termination that electrically connects a first electrical circuit to a second electrical circuit or a source of electricity. As used in this disclosure, a plug will have two or three metal pins.

Port: As used in this disclosure, a port is an electrical termination that is used to connect a first electrical circuit to a second external electrical circuit. In this disclosure, the port is designed to receive a plug.

PPWN: As used in this disclosure, the PPWN is an acronym for publically provided wireless network. The PPWN refers to a commercially provided and publicly available cellular wireless network.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Protected Space: As used in this disclosure, a protected space is a space formed by a boundary structure. The boundary structure forms a barrier that protects objects within the protected space from potential dangers from the other side of the boundary.

Screw: As used in this disclosure, to screw is a verb meaning: 1) to fasten or unfasten (unscrew) a threaded connection; or 2) to attach a helical structure to a solid structure.

Subscription: As used in this disclosure, a subscription refers to a contractual arrangement for the delivery of a product or access to a service on a recurring basis. The subscribed product or service can be provided on a continuous basis or on a scheduled basis. The term subscription often implies that the subscribed product or service has been paid for in advance.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Threaded Connection: As used in this disclosure, a threaded connection is a type of fastener that is used to join a first cylindrical object and a second cylindrical object together. The first cylindrical object is fitted with a first fitting selected from an interior screw thread or an exterior screw thread. The second cylindrical object is fitted with the remaining screw thread. The cylindrical object fitted with the exterior screw thread is placed into the remaining cylindrical object such that: 1) the interior screw thread and the exterior screw thread interconnect; and, 2) when the cylindrical object fitted with the exterior screw thread is rotated the rotational motion is converted into linear motion that moves the cylindrical object fitted with the exterior screw thread either into or out of the remaining cylindrical object. The direction of linear motion is determined by the direction of rotation.

Threaded Nut: As used in this disclosure, a threaded nut is a first object that is formed with a cylindrical negative space that further comprises an interior screw thread such that a second object with a matching exterior screw thread can screwed into the first object forming a threaded connection. A threaded nut is further defined with an inner diameter.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Wireless: As used in this disclosure, wireless is an adjective that is used to describe a communication link between two devices that does not require the use of physical cabling.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A secure package delivery receptacle comprising a receiving box and a control circuit;
   wherein the control circuit is contained in the receiving box;
   wherein the secure package delivery receptacle is a container;
   wherein the receiving box is a hollow structure;
   wherein the receiving box is configured for use with one or more packages;
   wherein the receiving box securely receives and stores the one or more packages;
   wherein the control circuit controls access into the hollow interior of the receiving box;
   wherein the control circuit scans a bar code found on the one or more packages;
   wherein the control circuit confirms that the scanned bar code is expected for delivery;
   wherein once the expected delivery is confirmed, the control circuit allows access into the receiving box for the delivery of one or more packages;
   wherein the control circuit is an electrically powered device;
   wherein the control circuit is an electromechanical device;
   wherein the control circuit is an electric circuit;
   wherein the control circuit controls access into the protected space formed by the receiving box;
   wherein the control circuit forms a wireless communication link with a personal data device;
   wherein the control circuit scans a bar code that is applied to a package selected from the one or more packages;
   wherein the control circuit transmits the scanned bar code information to the personal data device;
   wherein the control circuit receives confirmation that the package displaying the scanned bar code is expected for delivery;
   wherein after receiving confirmation that the selected package is expected, the control circuit allows access into the protected space formed by the receiving box;
   wherein a logic module is a programmable electronic device;
   wherein a communication module is a wireless electronic communication device;
   wherein the communication module establishes a wireless communication link between the control circuit and the personal data device;
   wherein the personal data device confirms that the bar code scanned by the bar code scanner is associated with a package selected from the one or more packages;
   wherein the wireless communication link forms a communication link between the control circuit and a commercially provided and publicly available cellular wireless network;
   wherein the commercially provided and publicly available cellular wireless network forms a communication link between the control circuit and the personal data device;
   wherein a bar code scanner is an electrical device;
   wherein the bar code scanner captures an image of the bar code that is applied to a package selected from the one or more packages;
   wherein the bar code scanner transmits the captured image to the logic module such that the logic module can decode the identifying information contained within the scanned bar code;
   wherein the bar code scanner transmits the decoded information to the personal data device to confirm that the package identified by the bar code is expected by the personal data device for delivery.

2. The secure package delivery receptacle according to claim 1
   wherein the receiving box forms a composite structure;
   wherein the receiving box is a hollow structure;
   wherein the receiving box is a container;
   wherein the receiving box forms a protected space used to receive and store the one or more packages;
   wherein the receiving box anchors to a supporting surface;
   wherein the supporting surface is hereinafter referred to as the ground.

3. The secure package delivery receptacle according to claim 2
   wherein the control circuit is an independently powered electric circuit;
   wherein by independently powered is meant that the control circuit can operate without an electrical connection to an external power source.

4. The secure package delivery receptacle according to claim 3
   wherein the receiving box comprises an anchor pedestal, a containment pan, a lid structure, a hinge, and a plurality of locking nuts;
   wherein the anchor pedestal forms a pedestal that transfers the loads of the receiving box, the control circuit, and the one or more packages to a ground;
   wherein the hinge attaches the lid structure to the containment pan;
   wherein the plurality of locking nuts secures the containment pan to the anchor pedestal.

5. The secure package delivery receptacle according to claim 4
   wherein the control circuit comprises a logic module, a communication module, and a power circuit;
   wherein the logic module further comprises a bar code scanner and an electronic lock;
   wherein the logic module, the communication module, the power circuit, the bar code scanner, and the electronic lock are electrically interconnected.

6. The secure package delivery receptacle according to claim 5
   wherein the anchor pedestal anchors to the ground;
   wherein the anchor pedestal forms an anchor point to which the balance of the receiving box attaches such that the receiving box remains in a fixed position;
   wherein a ballast is a bulk solid material that fills the hollow interior of the anchor structure;
   wherein the ballast provides mass to the anchor pedestal.

7. The secure package delivery receptacle according to claim 6
   wherein the anchor pedestal comprises an anchor structure, a ballast, and a plurality of anchor bolts;
   wherein the anchor structure is a hollow structure;
   wherein the anchor structure has a disk shape;
   wherein the anchor structure forms the final link of the load path that transfers the load of the secure package delivery receptacle and the one or more packages to the ground;
   wherein the anchor structure forms a pedestal that elevates the containment pan above the ground;
   wherein the containment pan attaches to the anchor structure to form a composite structure.

8. The secure package delivery receptacle according to claim 7
   wherein each of the plurality of anchor bolts is a bolt;

wherein each of the plurality of anchor bolts inserts through both faces of the disk structure of the anchor structure such that the ends of each of the plurality of anchor bolts extends beyond the faces of the disk structure of the anchor structure;

wherein each of the plurality of anchor bolts anchors the anchor structure into the ground;

wherein each of the plurality of anchor bolts inserts into the containment pan of the receiving box such that the containment pan can be anchored to the anchor pedestal.

9. The secure package delivery receptacle according to claim 8 wherein the containment pan has a pan shape;

wherein the containment pan forms the inferior and vertical boundaries of the protected space formed by the receiving box;

wherein the containment pan is a rigid structure;

wherein the containment pan contains the control circuit.

10. The secure package delivery receptacle according to claim 9 wherein the containment pan comprises an open face, a closed face, and a plurality of lateral faces;

wherein the closed face further comprises a plurality of anchor bolt nuts;

wherein each of the plurality of lateral faces is a vertically oriented surface;

wherein each of the plurality of lateral faces forms a portion of the vertical boundary of the protected space formed by the receiving box;

wherein the plurality of lateral faces forms the perimeter of the open face of the containment pan;

wherein the open face is the open face of the pan structure of the containment pan;

wherein the open face forms the superior boundary of the containment pan when the secure package delivery receptacle is properly anchored to the ground;

wherein the closed face is the closed face of the pan structure of the containment pan;

wherein the closed face is the face of the pan structure of the containment pan that is distal from the open face;

wherein the closed face forms the inferior boundary surface of the protected space formed by the receiving box;

wherein the face of the disk structure of the anchor structure is geometrically similar to the closed face of the containment pan;

wherein the closed face of the containment pan rests on the face of the disk structure of the anchor structure.

11. The secure package delivery receptacle according to claim 10 wherein each of the plurality of anchor bolt nuts is a clean nut;

wherein each of the plurality of anchor bolt nuts forms an aperture through the closed face of the containment pan;

wherein each of the plurality of anchor bolt nuts is positioned such that an anchor bolt selected from the plurality of anchor bolts inserts into the protected space formed by the receiving box through an anchor bolt nut selected from the plurality of anchor bolt nuts.

12. The secure package delivery receptacle according to claim 11 wherein the hinge is a fastening structure that attaches the lid structure to the containment pan;

wherein the hinge is a rotating structure;

wherein the hinge attaches the lid structure to the containment pan such that the lid structure rotates relative to the containment pan;

wherein the hinge attaches the lid structure to the containment pan such that the hinge is not accessible from the exterior of the receiving box.

13. The secure package delivery receptacle according to claim 12 wherein the lid structure is a disk-shaped structure;

wherein the faces of the disk structure of the lid structure are geometrically similar to the open face of the containment pan;

wherein the lid structure forms a rotating barrier that controls access to the protected space formed by the receiving box through the open face of the anchor pedestal;

wherein the lid structure rotates between an open position and a closed position;

wherein the lid structure encloses the open face of the containment pan when the lid structure is in the closed position;

wherein the lid structure provides access into the protected space formed by the receiving box when the lid structure is in the open position.

14. The secure package delivery receptacle according to claim 13 wherein each of the plurality of locking nuts is a threaded nut;

wherein the containment pan is anchored to the anchor pedestal by screwing a locking nut selected from the plurality of locking nuts onto an anchor bolt selected from the plurality of anchor bolts after the selected anchor bolt has been inserted through an anchor bolt nut selected from the plurality of anchor bolt nuts.

15. The secure package delivery receptacle according to claim 14 wherein the electronic lock is an electrically operated lock;

wherein the electronic lock locks the lid structure to the containment pan when the lid structure is in the closed position;

wherein the logic module controls the operation of the electronic lock;

wherein the logic module releases the electronic lock once the personal data device confirms the expected delivery of the selected package.

16. The secure package delivery receptacle according to claim 15 wherein the power circuit is an electrical circuit;

wherein the power circuit powers the operation of the control circuit;

wherein the power circuit is an electrochemical device;

wherein the power circuit converts chemical potential energy into the electrical energy required to power the control circuit.

17. The secure package delivery receptacle according to claim 16 wherein the power circuit comprises a battery, a diode, and a photovoltaic cell;

wherein the battery is a rechargeable battery;

wherein the photovoltaic cell is an electrical device that converts light into electrical energy;

wherein the photovoltaic cell is directly wired to the battery;

wherein the photovoltaic cell is an electrical circuit that reverses the polarity of the rechargeable battery;

wherein the diode is an electrical device that allows current to flow in only one direction;

wherein the diode installs between the rechargeable battery and the photovoltaic cell such that electricity will not flow from the first positive terminal of the rechargeable battery into the second positive terminal of the photovoltaic cell.

\* \* \* \* \*